US012225254B2

(12) United States Patent
Mayle

(10) Patent No.: US 12,225,254 B2
(45) Date of Patent: Feb. 11, 2025

(54) SYSTEM AND METHOD FOR PREVENTING STREAMING INFIDELITY

(71) Applicant: Christopher Mayle, Tampa, FL (US)

(72) Inventor: Christopher Mayle, Tampa, FL (US)

( * ) Notice: Subject to any disclaimer, the term of this patent is extended or adjusted under 35 U.S.C. 154(b) by 109 days.

(21) Appl. No.: 18/088,786

(22) Filed: Dec. 27, 2022

(65) Prior Publication Data

US 2023/0345066 A1 Oct. 26, 2023

Related U.S. Application Data

(60) Provisional application No. 63/334,088, filed on Apr. 23, 2022.

(51) Int. Cl.
*H04N 21/4415* (2011.01)
*H04N 21/258* (2011.01)

(52) U.S. Cl.
CPC ... *H04N 21/2585* (2013.01); *H04N 21/25841* (2013.01); *H04N 21/4415* (2013.01)

(58) Field of Classification Search
CPC ...................... H04N 21/2585; H04N 21/25841
See application file for complete search history.

(56) References Cited

U.S. PATENT DOCUMENTS

| | | | | |
|---|---|---|---|---|
| 7,685,619 B1* | 3/2010 | Herz | .................. | H04N 21/4147 715/848 |
| 2010/0157013 A1* | 6/2010 | Sylvain | ..................... | H04N 7/14 348/14.01 |
| 2013/0275519 A1* | 10/2013 | Nichols | .................... | H04L 67/75 709/206 |
| 2014/0337126 A1* | 11/2014 | Ohanyan | ............ | G06Q 30/0251 705/14.49 |
| 2017/0214953 A1* | 7/2017 | Mares | ................. | H04N 21/2393 |
| 2023/0164390 A1* | 5/2023 | Patel | ................. | H04N 21/47214 725/28 |

* cited by examiner

*Primary Examiner* — Jefferey F Harold
*Assistant Examiner* — Franklin S Andramuno
(74) *Attorney, Agent, or Firm* — Christopher Mayle; Bold IP PLLC

(57) ABSTRACT

A spoiler prevention system and method on streaming applications and other interactive platforms whereby hen the spoiler prevention system is active, spouses, friends, or other groups having multiple members, will not be able to watch new episodes of selected programs unless both parties are present at the location that the program is being viewed which may be determined by two separate codes entered by the parties, or that a computing device belonging to both parties is in proximity with one another or a streaming device, or by the parties logging into the mobile application on their computing devices.

14 Claims, 2 Drawing Sheets

SYSTEM AND METHOD FOR PREVENTING STREAMING INFIDELITY

CROSS REFERENCE TO RELATED APPLICATIONS

The application claims priority to U.S. Provisional Patent No. 63/334,088 filed on Apr. 23, 2021 which is incorporated in its entirety.

FIELD OF DISCLOSURE

The overall field of this invention is for a system and method for preventing spoilers between spouses and friends while watching a streaming application and more specifically for an application add-on that verifies one or more parties are present when watching a new program on a streaming application.

BACKGROUND

A recent survey says just about half of U.S. binge-watchers admit to "cheating" on their significant other by jumping ahead on a show they agreed to watch together. The reason why is both unsatisfying as it is predictable: A lack of self-control. Nearly 70% said they just needed to see what happens next. Once a person watches a program without their significant other, the significant other may become indifferent to the show, determining that they have fallen so far behind it is not worth it and the excitement is gone. Thus exists the need for a spoiler prevention system for streaming applications.

SUMMARY

The present disclosure recognizes the unsolved need for a spoiler prevention system and method on streaming applications and other interactive platforms. When the spoiler prevention system is active, spouses, friends, or other groups having multiple members, will not be able to watch new episodes of selected programs unless both parties are present at the location that the program is being viewed. This may be determined by two separate codes entered by the parties, or that a computing device belonging to both parties is in proximity with one another or a streaming device, or by the parties logging into the mobile application on their computing devices.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
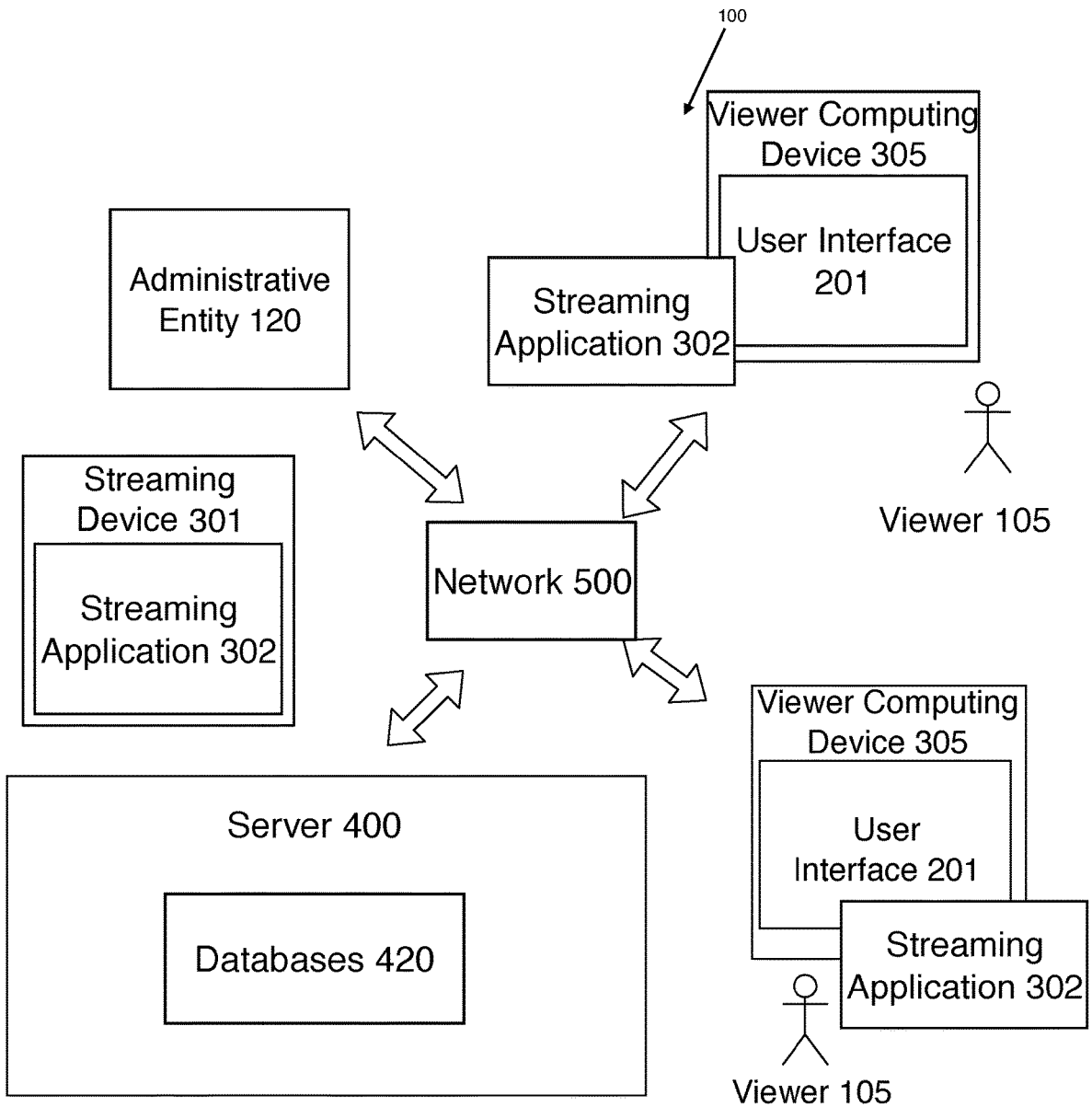
FIG. 1 depicts a block diagram of a spoiler prevention system.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

FIG. 1 is a block diagram of spoiler prevention system 100 constructed in accordance with the principals of the current invention. Spoiler prevention system 100 may include one or more viewers such as viewers 105 watching entertainment on one or more streaming devices 301. Viewers 105 may be located in various physical locations that are either located apart or are located in the vicinity of one other. Viewers 105 may access a user interface such as user interface 201 using streaming devices 301. Viewers 105 may also access a user interface 201 using a viewer computing device 305 which may be separate or the same as streaming devices 301. User interface 201 may have a plurality of buttons or icons that are selectable through user interface 201 that instruct spoiler prevention system 100 to perform particular processes in response to the selections. User interface 201 may include but not limited to a title bar, toolbars, pull-down menus, tabs, scroll bars, content help, dialog boxes, operating buttons (icons) and status bar that the user navigates throughout the display. The display appears in the browser window with the toolbar. Toolbar buttons activate the functionality. Toolbar buttons are active/inactive depending upon the tab and functionality presented in a view.

Viewer computing device 305 and streaming devices 301 may be in communication with one or more servers 400 such as server 400 via one or more networks such as network 500. Server 400 may be located at a data center or any other location suitable for providing service to network 500 whereby server 400 may be in one central location or in many different locations in multiple arrangements. Server 400 may include a database server such as MySQL® or Maria DB® server. Server 400 may have an attached data storage system storing software applications and data such as databases 420. Server 400 may receive requests and coordinate fulfillment of those requests through other servers. Server 400 may comprise computing systems similar to streaming devices 301 viewer computing device 305. Server 400 may be responsible for transforming extracted data of collected video content from events in different formats to a standardized format Modules may be configured to receive commands or requests from viewer computing device 305 and streaming device 301 and communicate appropriate responses to requesting computing devices. Serer 400 may have a control module with appropriate firmware or software and an operating system to control overall operation and configuration of spoiler prevention system 100. The controller module may be operable communication with a network interface module, which provides interface functionality over one or more networks (wired or wireless) and possibly connectivity with other communication media.

The controller module may also be in communication with an audio module and a video module, which receive and process audio and video data, respectively, from one or more connected video cameras or other input devices. The audio module may include, among other modules or components for processing audio data, speech detection and recognition modules and codecs for processing incoming or outgoing video data. A speech detection module can be configured to detect instances of speech at a site (for example, to trigger recording or other functions of spoiler prevention system 100), and/or determine the relative physical location of the detected speech for use in controlling the operation of individual microphones at the site. Speech recognition may be used to distinguish between individual voices for the purpose of filtering out other voices.

The video module may include image recognition modules for use in detecting speech or distinguishing between announcers or other individuals, and appropriate codecs for use in processing incoming or outgoing video data. The image recognition modules may include face tracking or pattern recognition algorithms to identify viewers 105 or any third parties. The audio and video modules may also include, respectively, interfaces for data communication between input units such as microphones and cameras, and output units such as speakers and display screens. The selection and implementation of appropriate speech and video modules, including codecs and speech detection/recognition modules, image recognition modules, including appropriate encoding, decoding, and compression algorithms, are those understood by those of ordinary skill in the art. Spoiler prevention system 100 may also be equipped with security modules providing end-to-end security with other systems and intermediate host systems. Recognition module may detect various players whereby viewers may select or be displayed information about players.

In one or more non-limiting embodiments, network 500 may include a local area network (LAN), such as a company Intranet, a metropolitan area network (MAN), or a wide area network (WAN), such as the Internet or World Wide Web. Network 500 may be a private network, a public network, or a combination thereof. Network 500 may be any type of network known in the art, including a telecommunications network, a wireless network (including Wi-Fi), and a wireline network. Network 500 may include mobile telephone networks utilizing any protocol or protocols used to communicate among mobile digital computing devices such as GSM, GPRS, UMTS, AMPS, TDMA, or CDMA. In one or more non-limiting embodiments, different types of data may be transmitted via network 500 via different protocols. In further non-limiting other embodiments, viewer computing device 305 and streaming devices 301, may act as stand-alone devices or they may operate as peer machines in a peer-to-peer (or distributed) network environment.

Network 500 may further include a system of terminals, gateways, and routers. Network 500 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices if, for instance, they are in a remote location not accessible by other networks. Network 500 is used to provide a communication path between viewers 105, server 300, and streaming devices 301. Spoiler prevention system 100 may be built using Web-based technology.

Spoiler prevention system 100 may also include one or more administrative entities such as administrative entity 120. While administrative entity 120 is depicted as a single element communicating over network 500, administrative entity 120 in one or more non-limiting embodiments may be distributed over network 500 in any number of physical locations. Administrative entity 120 may manipulate the software and enter commands to server 400 using any number of input devices such as keyboard and mouse. The input/output may be viewed on a display screen to administrative entity 120.

Figure 2:
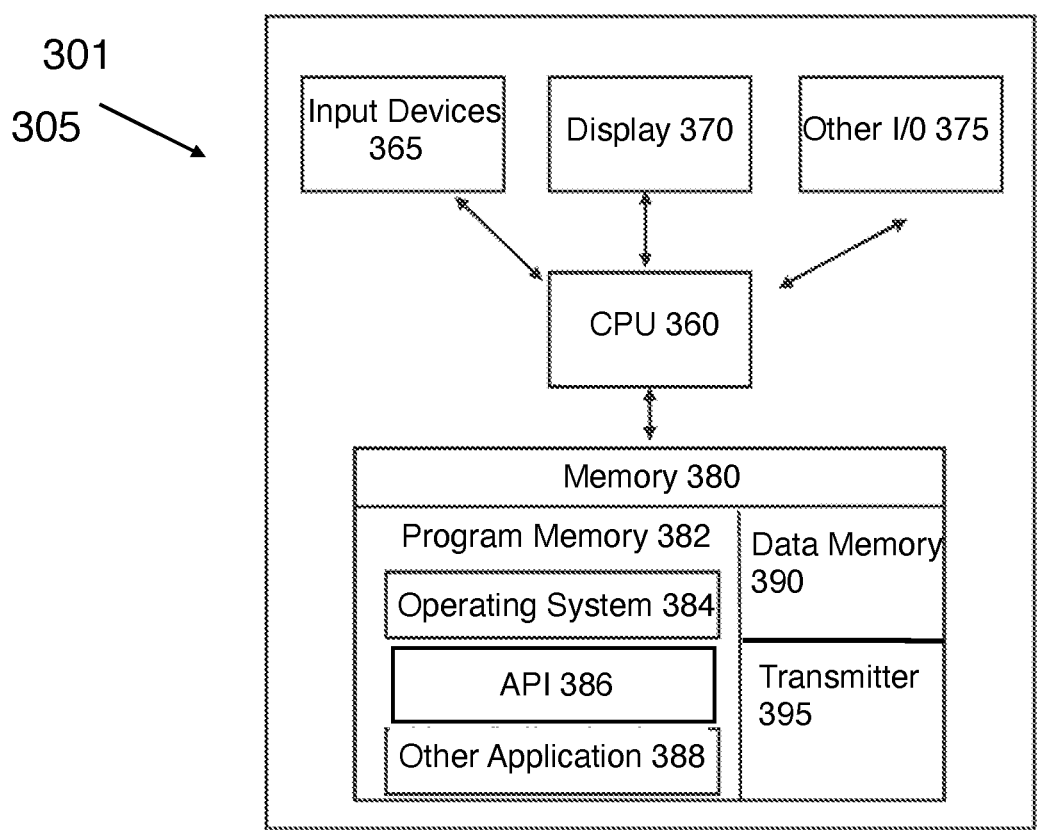
FIG. 2 depicts the components of a computing device.

One or more embodiments of viewer computing device 305 and streaming devices 301 are further detailed in FIG. 2 whereby both may be a type of user computing device or specially tailored for the specific use of viewers 105. Viewer computing device 305 and streaming devices 301 may comprise hardware components that allow access to edit and query Spoiler prevention system 100. Viewer computing device 305 and streaming device 301 may include one or more input devices such as input devices 365 that provide input to a CPU (processor) such as CPU 360 notifying it of actions. The actions may be mediated by a hardware controller that interprets the signals received from input device 365 and communicates the information to CPU 360 using a communication protocol. Input devices 365 may include but are not limited to a mouse, a keyboard, a touchscreen, an infrared sensor, a touchpad, a wearable input device, a camera- or image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU may communicate with a hardware controller for devices, such as for a display 370. Display 370 may be used to display text and graphics. In some examples, display 370 provides graphical and textual visual feedback to a user. In some implementations, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU 360 may have access to a memory such as memory 380. Memory 380 may include one or more of various hardware devices for volatile and non-volatile storage and may include both read-only and writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory. Memory 380 may include program memory such as program memory 382 capable of storing programs and software, such as an operating system such as operating system 384, spoiler prevention API 386, and other computerized programs or application programs such as other application programs 388. Memory 380 may also include data memory such as data memory 390 that may include database query results, configuration data, settings, user options or preferences, etc., which may be provided to program memory 382 or any element of viewer computing device 305 and streaming device 301.

Viewer computing device 305 and streaming device 301 may in some embodiments be mobile computing devices such as an iPhone, Android-based phone, or Windows-based phone, however, this is non-limiting and they may be any computing device such as a tablet, television, desktop computer, laptop computer, gaming system, wearable device electronic glasses, networked router, networked switch, networked bridge, or any computing device capable of executing instructions with sufficient processor power and memory capacity to perform operations of spoiler prevention system 100 while in communication with network 500. Viewer computing device 305 and streaming device 301 may have location tracking capabilities such as Mobile Location Determination System (MLDS) or Global Positioning System (GPS) whereby they may include one or more satellite radios capable of determining the geographical location of a computing device.

Viewers 105 may initially register to become a registered user associated with spoiler prevention system 100 and spoiler prevention system API 386 or any streaming application 302 on which spoiler prevention system API 386 is integrated. Streaming application 302 may be downloadable and installable on streaming devices 301 and viewer computing device 305 through an API. In one or more non-limiting embodiments, spoiler prevention system 100 may be preinstalled on streaming application 302 by the manufacturer or designer. Further, spoiler prevention system 100 be implemented using a web browser via a browser extension or plugin. The user activity is date and time stamped for remuneration if desired.

Upon initially signing up with streaming application 302, viewers 105 may be prompted to provide an email address. After entering an email address, viewers 105 may be presented with a text window interface whereby viewers 105 may enter their name, username, password, phone number, address and a selected PIN number or password. In one or more non-limiting embodiments, location of viewers 105 may be verified by server 400 using the global positioning system (GPS) capabilities of viewer computing device 305. Server 400 then may generate a code that is transmitted to the viewer's selected email or user computing device by text message whereby viewers 105 may verify their account by entering the generated code into a text block window.

In one or more non-limiting embodiments, viewers 105 may search for a specific program which may be a show, movie, sporting event, music, or any other form of content, on streaming application 302. Streaming application 302 may come from an existing database 420 stored on server 400 or a third-party database that server 400 is in communication with, whereby server 400 may receive results from a third-party connected database. User interface 201 may present to viewers 105 a search window whereby a search request having a character string may be entered, where one or more shows may be identified using name or other metadata pertaining to the show.

Viewers 105 may be presented with a selectable button through user interface 201 for initiating a new program or program into spoiler prevention system 100. After selecting this option, viewers 105 may be presented with a screen whereby viewers 105 may be prompted to select one or more options for the show. The options may be a selectable option for initiating the program into spoiler prevention system 100 as well as the specific criteria for being in said program. For instance, if viewers 105 want to prevent specific seasons or episodes from being watched without other viewers 105. Viewers 105 may also select if they only wish new episodes to be prevented from being accessed or every episode. Viewers 105 may also select if they want to prevent partially viewed episodes from being watched.

The viewers 105 then may select which profiles on streaming application will be watching this program and thus will be involved in spoiler prevention system 100. In one embodiment this may be a husband in wife while in another embodiment this may be a group of friends. Viewers 105 may also connect to other viewers 105 who are not on the same account via a friend system such that viewers 105 who are on separate accounts or at separate locations may still take part in spoiler prevention system 100. Streaming application 302 may include a selectable button to add one or more viewers 105 as friends. After selecting the button to add a viewer, user interface 201 may display a search window whereby viewer 105 may search for a viewer from the pool of viewers. A search request having a character string may be entered into the search window by viewers 105 whereby server 400 may receive this request and then display one or more other viewers, identified using their name or other metadata related to the viewers. If viewers 105 wants to add a viewer, viewers 105 select the option to request that the viewers 105 be added to the list.

In some non-limiting embodiments viewers 105 may be presented a calendar user interface where viewers 105 can select days, weeks, or months, where the episodes or seasons of the programs will be unlocked or specific time periods or windows for staggered viewing for viewers 105 on different accounts. This would be advantageous for worldwide viewing parties. Spoiler prevention system 100 may also present options for unlocking programs automatically after a specified time period such as after three days for every new episode.

Upon successful registration of a show or program into spoiler prevention system 100, the one or more programs may be prevented from being viewed when navigating through steaming application 302. If viewers 105 select the program, a prompt may be presented where the profiles enrolled into spoiler prevention system 100 for that program may have to insert their PIN or code whereby the program may be accessed. During this operation, viewers 105 may be presented with a drop down menu whereby they may insert the PIN or code directly onto streaming device 301 or through connected viewer computing devices 305 that are logged into the account or profile. For instance, while watching a Hulu program on their television, viewers 105 may log into the Hulu program on their phone and be presented with the option to insert the code through user interface 201. Viewers 105 may preemptively prevent spoilers for upcoming programs by being presented programs that will appear on streaming application 302 in the future.

In one or more embodiments, unlocking access to programs may be based on the location of viewer computing devices 305. For instance, programs may be unlocked only if viewers 105 are within a predetermined distance of streaming device 110. This may be determined by GPS of viewer computing devices 305 associated with viewers 105, inputted information corresponding to the location, viewer computing devices 305 are on the same network as streaming device 301, or NFC technology or other short distance protocols are used to determine that viewer computing devices 305 are within proximity to streaming devices or within proximity to each other.

Upon successful authentication of viewers 105, server 400 may present the one or more programs selected by viewer 105. For instance, viewer 105 may be presented with a specific show or unlock an entire streaming application 302. Streaming application 302 may also present to viewers 105 options of how many times or after what time period may streaming application 302 once again ask for verification. This may be after each episode, after each season, after each day, or any other specified period. Once an episode or other content has been finished it may be permanently unlocked for future viewing or still protected depending on the settings of viewers 105. This is an ever fluid approach differentiating from parental controls which is stagnant on what programs are protected.

Server 400 may generate synchronization messages, such as an email message, text message, or calendar invitation for each user related to the upcoming events causing the upcoming events to be included in a local personal information manager application connected to spoiler prevention system 100 such as Microsoft Outlook and Google Calendar. In one implementation, the synchronization message may include a calendar data exchange file, such as an iCalendar (.ics) file in compliance with IETF RFC 5545.

Viewers 105 may opt-in for spoiler prevention system 100 notifications to be transmitted by server 400. Viewers 105 may opt-in to allow spoiler prevention system 100 through streaming application 302, to notify viewers 105 when certain events occur, such as events related to other viewers 105 including if viewers 105 are trying to access a program whereby then viewer 105 may be prompted with an approval request. If viewers 105 approve the request the program may be unlocked while if they deny the request the program will remain locked.

Server 400 may send reminders to automatically alert viewers 105 of an upcoming event such as the unlocking of an episode or a viewing party. Default reminder settings may be overridden and configured based on the preference of users. Default reminder settings may be configured to provide automatic reminders at one week, on business day, and one hour prior to the designated time of the upcoming events. Message recipients, message formats, and reminder settings for individual managers may be configured based on the preference of users or administrative entities. In further embodiments users may be presented an option to direct them to google translate for foreign language speaking.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. A system for preventing spoilers on one or more platforms, the system comprising:
   one or more databases coupled via a network;
   one or more processors coupled to the one or more databases; and
   one or more computing devices coupled to the one or more processors and the one or more databases via the network, wherein the system performs steps of:
   registering a first user into the system;
   registering a second user into the system;
   registering one or more content into the system;
   determining a first location of a first computing device associated with the first user;
   determining a second location of a second computing device associated with the second user;
   determining that the first location and the second location are within a predetermined distance to each other or that the first location and the second location are within a predetermined distance to a streaming device that will be streaming one or more parts of the one or more content; and
   granting access to the one or more parts of the one or more content that the first user and the second user have not watched.

2. The system of claim 1, wherein the system further performs the steps of:
   associating a first access code with the first user; and
   associating a second access code with the second user.

3. The system of claim 2, wherein the first access code is selected by the first user, wherein the second access code is selected by the second user.

4. The system of claim 1, wherein the system further performs the steps of:
   transmitting a notification to the first computing device of the first user that the second user has accessed or is accessing the one or more parts of the one or more content that the first user has not watched yet.

5. A system for preventing spoilers on one or more streaming platforms, the system comprising:
   one or more databases coupled via a network;
   one or more processors coupled to the one or more databases; and
   one or more computing devices coupled to the one or more processors and the one or more databases via the network, wherein the system performs steps of:
   registering a first user into the system associated with a first account or profile;
   registering a second user into the system associated with a second account or profile;
   registering one or more content into the system, wherein the one or more content is video or audio, wherein one or more parts of the one or more content not previously watched or listened to by the first user or the second user are locked;
   determining a first location of a first computing device associated with the first user;
   determining a second location of a second computing device associated with the second user;
   determining that the first location and the second location are within a predetermined distance to each other or that the first location and the second location are within a predetermined distance to a streaming device that will be streaming the one or more parts of the one or more content; and unlocking the one or more parts of the one or more content.

6. The system of claim 5, wherein the system further performs the steps of:

associating a first access code with the first user;

associating a second access code with the second user; and prompting the first user to input the first access code and the second user to input the second access code when accessing the one or more parts of the one or more content.

7. The system of claim 6, wherein the system further performs the steps of:

receiving the first access code from the first user;

receiving the second access code from the second user; and unlocking the one or more parts of the one or more content.

8. The system of claim 5 wherein the system further performs the steps of:

transmitting a notification to the first computing device of the first user that the second user has accessed or is accessing a part of the one or more content that the first user has not watched.

9. A system for preventing spoilers on one or more streaming platforms, the system comprising:

one or more databases coupled via a network;

one or more processors coupled to the one or more databases; and one or more computing devices coupled to the one or more processors and the one or more databases via the network, wherein the system performs steps of:

registering a first user into the system;

registering a second user into the system;

registering one or more content into the system, wherein one or more parts of the one or more content not previously watched by the first user or the second user are locked;

unlocking the one or more parts of the one or more content by determining that the system has been accessed by the first user on a first computing device at a first location and that the system has been accessed by the second user on a second computing device at a second location and the first location and the second location are within a predetermined range of one another of within a predetermined range of a streaming device that will be playing the one or more content; and generating a calendar user interface with selectable days, weeks, or months, where the one or more parts of the one or more content is then unlocked at specific time periods or windows for staggered viewing.

10. The system of claim 9, wherein the system further performs the steps of:

unlocking the one or more parts of the one or more content after a predesignated time chosen by the first user and the second user.

11. The system of claim 9, wherein the system further performs the steps of:

unlocking the one or more parts of the one or more content by receiving access codes from the first user and the second user.

12. The system of claim 9, wherein the system further performs the steps of:

preemptively locking the one or more parts of the one or more content before being released.

13. The system of claim 9, wherein the system further performs the steps of:

relocking an unwatched subsection of the one or more parts of the one or more content after a predesignated amount of the one or more parts of the one or more content has been viewed.

14. The system of claim 9, wherein the system further performs the steps of:

relocking an unwatched subsection of the one or more parts of the one or more content after a predesignated amount of time.

* * * * *